J. F. O'CONNOR.
ELECTROMAGNETICALLY CONTROLLED SHOCK ABSORBING MECHANISM.
APPLICATION FILED JUNE 9, 1917.
1,293,889.
Patented Feb. 11, 1919.
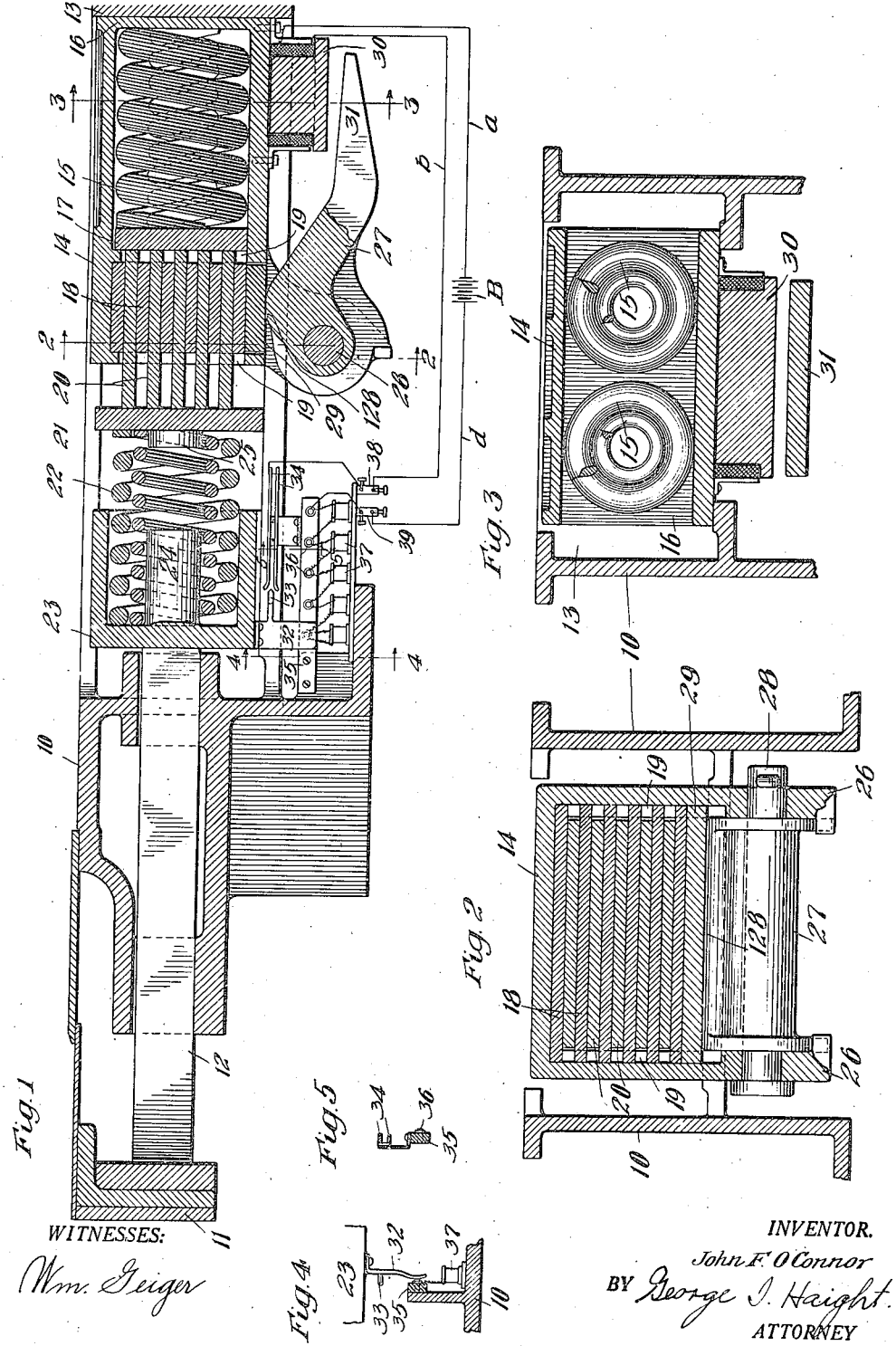
WITNESSES:
Wm. Geiger
INVENTOR.
John F. O'Connor
BY George J. Haight.
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

ELECTROMAGNETICALLY-CONTROLLED SHOCK-ABSORBING MECHANISM.

1,293,889.　　　Specification of Letters Patent.　　Patented Feb. 11, 1919.

Application filed June 9, 1917. Serial No. 173,355.

*To all whom it may concern:*

Be it known that I, JOHN F. O'CONNOR, a citizen of the United States, residing at Chicago, in the county of Cook and State of Illinois, have invented a certain new and useful Improvement in Electromagnetically-Controlled Shock-Absorbing Mechanism, of which the following is a full, clear, concise, and exact description, reference being had to the accompanying drawings, forming a part of this specification.

This invention relates to improvements in electro-magnetically controlled shock absorbing mechanism.

One object of the invention is to provide a shock absorbing mechanism of the friction type and more particularly adapted for use on railway cars and wherein electro-magnetically controlled means are provided for governing the amount of friction.

In the drawing forming a part of this specification, Figure 1 is a longitudinal vertical sectional view of the end of a passenger car showing my improvements as applied to the buffer mechanism thereof. Fig. 2 is a transverse vertical sectional view of the structure illustrated in Fig. 1, and taken on the line 2—2 thereof. Fig. 3 is a view similar to Fig. 2 and taken on the line 3—3 of Fig. 1. Fig. 4 is a detail sectional view, taken substantially on the line 4—4 of Fig. 1. And Fig. 5 is a view similar to Fig. 4, taken on the line 5—5 of Fig. 1.

In said drawing, 10 denotes the end of the platform casting of a passenger car, 11 the buffer plate, 12 the central buffer stem, and 13 the rear wall against which the buffer mechanism proper bears.

The buffer mechanism, as shown, comprises a substantially rectangular casting 14 within which are located twin arranged springs 15, the latter bearing at their rear end against the integral wall 16 of the casting 14 and at their forward ends against a slidable follower 17. Carried by the casting 14 is a series of relatively stationary friction plates 18, the same being inserted vertically within the casting 14 between a pair of suitable guiding flanges 19—19. Coöperating with the friction plates 18 is another series of longer friction plates 20, the latter being alternated with the friction plates 18 and extending beyond the latter both forwardly and rearwardly. The friction plates 20 at their rear ends engage said follower 17 and are adapted to actuate the latter, as will be understood. At their forward ends, the plates 20 engage a second follower 21 against the forward face of which bears a two-coil spring 22, said spring 22 at its forward end being seated within a hollow spring follower 23 against which the rear end of the buffer stem 12 abuts. The follower 23 is provided on its inner face with a rearward extension 24 adapted to engage a corresponding lug 25 on the forward face of the follower 21 to limit the compression of the spring 22.

Upon inward movement of the buffer plate 11, it is obvious that the stem 12 will be forced inwardly, thus compressing the spring 22 until the follower 23 engages the follower 21. Thereafter, further inward movement of the buffer plate 11 will be resisted by the springs 15 acting through the friction plates 20.

In order to govern the amount of friction between the friction plates 18 and 20, I provide the following electromagnetically controlled means: The casting 14, at its forward end, is provided with a downwardly extending pair of flanges 26—26 between which is pivotally mounted a lever 27 on a pin 28. Said lever 27 is provided on its upper face with a cam surface 28 adapted to engage the under side of a slidable block 29, said block 29 engaging the lowermost friction plate 18 and being guided by said flanges 19—19. Secured to the under face of the casting 14 near its rear end, is an electro-magnet 30 with which coöperates the lever 27, the latter at its rear end 31 acting as an armature for the magnet 30 and being normally spaced therefrom. Secured to the follower 23 is a depending blade 32 which carries one element 33 of a knife switch, the other element of said knife switch comprising a pair of parallel spring arms 34—34 carried by a portion of the car framework and insulated therefrom, as indicated in Fig. 5. Also carried by the car framework is a contact bar 35, said bar 35 having a series of contact points 36 with which the depending arm 32 is adapted to make sliding electrical contact upon movement of the follower 23 (see Figs. 1 and 4). The contacts 36 are connected with a series of resistance coils 37 and so arranged that, as the contact arm 32 moves inwardly or to the right, as viewed in Fig. 1, the resistance coils 37 are cut out successively.

The electrical circuit for the electro-magnet and resistance coils is indicated diagrammatically in the drawing wherein B is a conventional representation of any suitable source of electrical power, such as a battery, wire $a$ from one side of said battery running to the electro-magnet 30 and the return wire $b$ from the electro-magnet running to the binding post 38. From the latter a connection $c$ is made to the blades 34—34 of the knife switch the circuit being completed through the knife blade 33 when the latter engages the members 34 and through the resistance coils 37 back to another binding post 39 and finally through the return wire $d$ to the battery B.

As will be apparent, upon inward movement of the follower 23, the circuit will be completed when the knife blade 33 engages the members 34, thus energizing the electro-magnet 30, the amount of energization being at a minimum, however, due to the fact that the current is reduced because of all the resistance coils being included in the circuit. As the follower 23 continues its movement, its is obvious that the resistance is gradually cut out thus increasing the current supplied to the electro-magnet which in turn increases the attraction for the armature 31. As the armature 31 (lever 27) is drawn to the electro-magnet 30, it is obvious that the cam surface 28 will gradually increase the pressure between the friction plates 18 and 20, the maximum pressure being reached as the follower 23 reaches its innermost position. Upon release, it is obvious that the electro-magnet 30 will be gradually deënergized as the follower 23 returns toward normal position.

I claim:

1. In a shock absorbing mechanism, the combination with relatively stationary and movable friction elements, spring means for resisting movement of said movable friction elements, of an electro-magnetically controlled pressure member for governing the frictional resistance between said elements during relative movement therebetween, said member being pivoted about an axis extending parallel to said plates and acting to apply pressure transversely of said plates.

2. In a device of the character described, the combination with a friction shock absorber including stationary friction plates, friction plates longitudinally movable relatively to said stationary friction plates, and spring means alined with said friction plates for resisting relative movement between said plates, of electro-magnetically controlled means for varying the pressure between said plates and dependent upon the position of the movable plates relatively to the stationary plates.

3. In a shock absorbing mechanism, the combination with a plurality of stationary friction elements, a plurality of movable friction elements coöperable therewith and slidable lineally with respect thereto, spring means for resisting movement of the movable friction elements, and means, including a follower, for imparting lineal movement to the movable friction elements, of a pressure member arranged to vary the frictional resistance between said movable and stationary friction elements, an electro-magnet for actuating said pressure member, and means dependent upon the position of said follower for governing the current supplied to the electro-magnet.

4. In a shock absorbing mechanism, the combination with a follower, a casing, springs mounted within the casing, a plurality of stationary friction plates carried by said casing, and a plurality of movable friction plates alternated with the stationary friction plates, of a pressure controlling lever acting upon said friction plates, an electro-magnet governing the position of said lever, and means governed by the position of said follower for varying the current supplied to the electro-magnet.

5. In a shock absorbing mechanism, the combination with a movable follower, a plurality of relatively stationary friction plates, a plurality of movable friction plates alternated with the stationary friction plates, spring means for resisting movement of the movable friction plates, an electro-magnet, a pressure-lever-armature coöperable with said magnet and adapted to vary the pressure between the stationary and movable friction plates, and variable resistance in the circuit for the electro-magnet, the amount of resistance in the circuit being dependent upon the position of said movable follower.

6. In a shock absorbing mechanism for railroad cars, the combination with a longitudinally movable pressure-transmitting element, of a spring resistance in alinement with said element, and electro-magnetically governed frictional resistance in alinement with said spring resistance, said frictional resistance varying in accordance with the position of said element.

In witness that I claim the foregoing I have hereunto subscribed my name this 24th day of May, 1917.

JOHN F. O'CONNOR.